United States Patent
Wu et al.

(10) Patent No.: US 10,880,455 B2
(45) Date of Patent: Dec. 29, 2020

(54) HIGH DYNAMIC RANGE COLOR CONVERSION USING SELECTIVE INTERPOLATION

(71) Applicant: Apple Inc., Cupertino, CA (US)

(72) Inventors: Chihsin Wu, San Jose, CA (US); David R. Pope, Fremont, CA (US)

(73) Assignee: Apple Inc., Cupertino, CA (US)

( * ) Notice: Subject to any disclaimer, the term of this patent is extended or adjusted under 35 U.S.C. 154(b) by 57 days.

(21) Appl. No.: 16/364,049

(22) Filed: Mar. 25, 2019

(65) Prior Publication Data

US 2020/0314289 A1 Oct. 1, 2020

(51) Int. Cl.
| | |
|---|---|
| H04N 1/60 | (2006.01) |
| G06T 3/40 | (2006.01) |
| G06T 5/00 | (2006.01) |
| H04N 9/73 | (2006.01) |
| H04N 5/365 | (2011.01) |

(52) U.S. Cl.
CPC ......... H04N 1/6019 (2013.01); G06T 3/4015 (2013.01); G06T 5/003 (2013.01); G06T 5/009 (2013.01); H04N 5/365 (2013.01); H04N 9/735 (2013.01); G06T 2207/10024 (2013.01); G06T 2207/20028 (2013.01); G06T 2207/20208 (2013.01)

(58) Field of Classification Search
CPC ...... H04N 1/6019; H04N 5/365; G06T 5/006; G06T 5/003; G06T 3/4015; G06T 3/0093; G06T 1/60; G06T 2207/20021
USPC .......................................................... 382/167
See application file for complete search history.

(56) References Cited

U.S. PATENT DOCUMENTS

| | | | |
|---|---|---|---|
| 6,646,763 B1 | 11/2003 | Estrada | |
| 7,706,036 B2 | 4/2010 | Yoshida et al. | |
| 7,945,114 B2 | 5/2011 | Shimizu et al. | |
| 8,514,453 B2 | 8/2013 | Mebane | |
| 8,872,946 B2 | 10/2014 | Cote et al. | |
| 9,025,867 B2 | 5/2015 | Cote et al. | |
| 9,332,239 B2 | 5/2016 | Cote et al. | |
| 9,741,099 B2 | 8/2017 | Lim et al. | |
| 2005/0259286 A1* | 11/2005 | Iwaki | H04N 1/628 358/1.9 |
| 2006/0181720 A1* | 8/2006 | Kakutani | H04N 1/648 358/1.9 |

(Continued)

OTHER PUBLICATIONS

Vadenberg, J. et al., "A Survey on 3D-LUT Performance in 10-bit and 12-bit HDR BT.2100 PQ," SMPTE 2018 Annual Technical Conference & Exhibition, 18 pages.

*Primary Examiner* — Congvan Tran
(74) *Attorney, Agent, or Firm* — Fenwick & West LLP

(57) ABSTRACT

Embodiments relate to circuitry for pixel conversion of images for display. A circuit converts input pixel values of an image using a color conversion function. A lookup table memory circuit stores a mapping of color converted values and input pixel values where the mapping represents the color conversion function. The circuit produces a color converted value from the lookup table as a color converted version of a first input pixel value responsive to the first input pixel value being within a first range. The circuit may also produce a color converted version of a second input pixel value by interpolating a subset of the color converted values received from the lookup table responsive to the second input pixel being within a second input range.

20 Claims, 11 Drawing Sheets

(56) References Cited

U.S. PATENT DOCUMENTS

| | | | |
|---|---|---|---|
| 2009/0147020 A1* | 6/2009 | Sellers | H04N 9/642 345/603 |
| 2011/0026052 A1* | 2/2011 | Edge | G09G 5/02 358/1.9 |
| 2011/0026821 A1* | 2/2011 | Edge | G01J 3/463 382/167 |
| 2011/0149166 A1* | 6/2011 | Botzas | H04N 9/73 348/649 |
| 2013/0265342 A1* | 10/2013 | Fujimura | G09G 5/02 345/690 |
| 2017/0142446 A1* | 5/2017 | Leleannec | H04N 19/196 |
| 2018/0259824 A1* | 9/2018 | Bouchard | G09G 5/06 |
| 2018/0315170 A1* | 11/2018 | Mills | G06T 1/60 |
| 2018/0352259 A1 | 12/2018 | Guo et al. | |
| 2019/0035063 A1* | 1/2019 | Park | G06T 5/007 |

* cited by examiner

HIGH DYNAMIC RANGE COLOR CONVERSION USING SELECTIVE INTERPOLATION

BACKGROUND

1. Field of the Disclosure

The present disclosure relates a circuit for processing images and more specifically to color conversion in high dynamic range (HDR) images.

2. Description of the Related Arts

Image data captured by an image sensor or received from other data sources is often processed in an image processing pipeline before further processing or consumption. For example, raw image data may be corrected, filtered, or otherwise modified before being provided to subsequent components such as a video encoder. To perform corrections or enhancements for captured image data, various components, unit stages or modules may be employed.

Such an image processing pipeline may be structured so that corrections or enhancements to the captured image data can be performed in an expedient way without consuming other system resources. Although many image processing algorithms may be performed by executing software programs on central processing unit (CPU), execution of such programs on the CPU would consume significant bandwidth of the CPU and other peripheral resources as well as increase power consumption. Hence, image processing pipelines are often implemented as a hardware component separate from the CPU and dedicated to perform one or more image processing algorithms.

One of such operations performed by the image processing pipeline is conversion of image data in one format to HDR. To convert to HDR format, a color conversion function may be used to convert pixel data to a particular brightness.

SUMMARY

Embodiments relate to circuitry for converting input image pixel values of images into output image pixel values using a color conversion function. In one embodiment, the color conversion function is an inverse electro-optical transfer function ($EOTF^{-1}$) that complies with the BT.2100 standard for HDR displays. However, the color conversion function can be any type of function such as a power function. A portion of the color conversion function near zero signal can cause distortion when input image pixel values near zero are converted using linear interpolation due to the steepness of the color conversion function near zero.

In one embodiment, the color conversion function is divided into two regions with a first region including first input pixel conversion values near zero signal and corresponding first output pixel conversion values and a second region including second input pixel conversion values and corresponding second output pixel conversion values. The circuitry converts input image pixel values of an image that are in the first region of the color conversion function by fetching from a lookup table output pixel conversion values that are indexed to the first input image pixel values in the lookup table. In contrast, the circuitry performs linear interpolation to calculate a converted output image pixel value for an input image pixel value in the second region.

Figure 1:
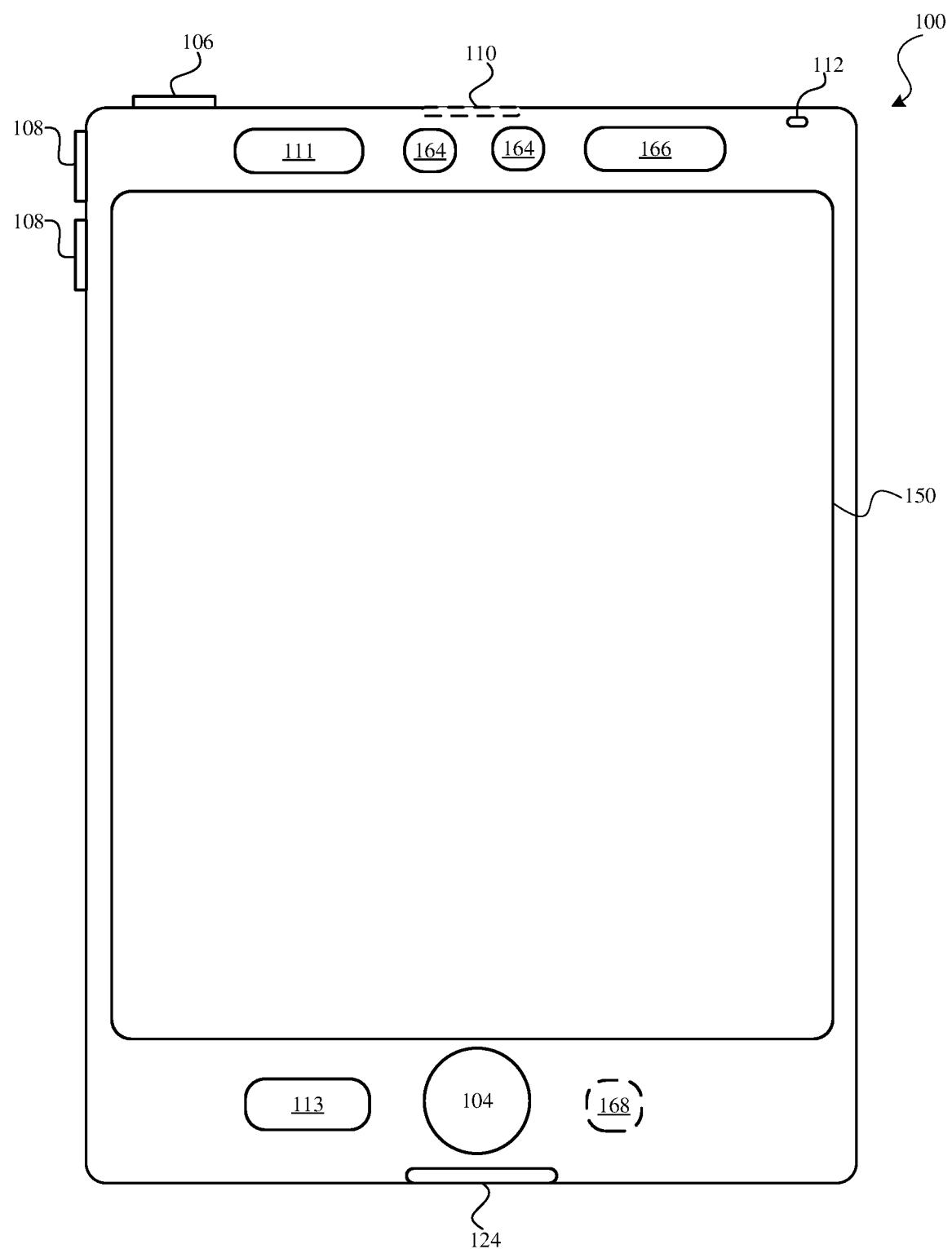
FIG. 1 is a high-level diagram of an electronic device, according to one embodiment

The figures depict, and the detail description describes, various non-limiting embodiments for purposes of illustration only.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, the described embodiments may be practiced without these specific details. In other instances, well-known methods, procedures, components, circuits, and networks have not been described in detail so as not to unnecessarily obscure aspects of the embodiments.

Embodiments of the present disclosure relate to a circuit for converting input image pixel values into output image pixel values of high dynamic range (HDR) format using a color conversion function. A look-up table stores values corresponding to the color conversion function. In a first region including first input pixel conversion values near zero signal, the look-up table may index different color components of each pixel. But in the second region of the color conversion function, the look-up table stores output pixel conversion values for only a portion of all possible input pixel conversion values in the second region of the color conversion function rather than for all possible input pixel conversion values in the second region. The circuit can calculate a converted output image pixel value for an input pixel image value in the second region using linear interpolation of the output pixel conversion values of the lookup table that are associated with the second region of the color conversion function. In this way, more accurate color converted values can be obtained in the first region while providing reasonably accurate color converted values in the second region without significantly increasing memory of the circuit.

Exemplary Electronic Device

Embodiments of electronic devices, user interfaces for such devices, and associated processes for using such devices are described. In some embodiments, the device is a portable communications device, such as a mobile telephone, that also contains other functions, such as personal digital assistant (PDA) and/or music player functions. Exemplary embodiments of portable multifunction devices include, without limitation, the iPhone®, iPod Touch®, Apple Watch®, and iPad® devices from Apple Inc. of Cupertino, Calif. Other portable electronic devices, such as wearables, laptops or tablet computers, are optionally used. In some embodiments, the device is not a portable communications device, but is a desktop computer or other computing device that is not designed for portable use. In some embodiments, the disclosed electronic device may include a touch sensitive surface (e.g., a touch screen display and/or a touch pad). An example electronic device described below in conjunction with FIG. 1 (e.g., device 100) may include a touch-sensitive surface for receiving user input. The electronic device may also include one or more other physical user-interface devices, such as a physical keyboard, a mouse and/or a joystick.

Figure (FIG. 1 is a high-level diagram of an electronic device 100, according to one embodiment. Device 100 may include one or more physical buttons, such as a "home" or menu button 104. Menu button 104 is, for example, used to navigate to any application in a set of applications that are executed on device 100. In some embodiments, menu button 104 includes a fingerprint sensor that identifies a fingerprint on menu button 104. The fingerprint sensor may be used to determine whether a finger on menu button 104 has a fingerprint that matches a fingerprint stored for unlocking device 100. Alternatively, in some embodiments, menu button 104 is implemented as a soft key in a graphical user interface (GUI) displayed on a touch screen.

In some embodiments, device 100 includes touch screen 150, menu button 104, push button 106 for powering the device on/off and locking the device, volume adjustment buttons 108, Subscriber Identity Module (SIM) card slot 110, head set jack 112, and docking/charging external port 124. Push button 106 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. The device 100 includes various components including, but not limited to, a memory (which may include one or more computer readable storage mediums), a memory controller, one or more central processing units (CPUs), a peripherals interface, an RF circuitry, an audio circuitry, speaker 111, microphone 113, input/output (I/O) subsystem, and other input or control devices. Device 100 may include one or more image sensors 164, one or more proximity sensors 166, and one or more accelerometers 168. Device 100 may include more than one type of image sensors 164. Each type may include more than one image sensor 164. For example, one type of image sensors 164 may be cameras and another type of image sensors 164 may be infrared sensors that may be used for face recognition. In addition or alternatively, the image sensors 164 may be associated with different lens configuration. For example, device 100 may include rear image sensors, one with a wide-angle lens and another with as a telephoto lens. The device 100 may include components not shown in FIG. 1 such as an ambient light sensor, a dot projector and a flood illuminator.

Device 100 is only one example of an electronic device, and device 100 may have more or fewer components than listed above, some of which may be combined into a component or have a different configuration or arrangement. The various components of device 100 listed above are embodied in hardware, software, firmware or a combination thereof, including one or more signal processing and/or application specific integrated circuits (ASICs). While the components in FIG. 1 are shown as generally located on the same side as the touch screen 150, one or more components may also be located on an opposite side of device 100. For example, the front side of device 100 may include an infrared image sensor 164 for face recognition and another image sensor 164 as the front camera of device 100. The back side of device 100 may also include additional two image sensors 164 as the rear cameras of device 100.

Figure 2:
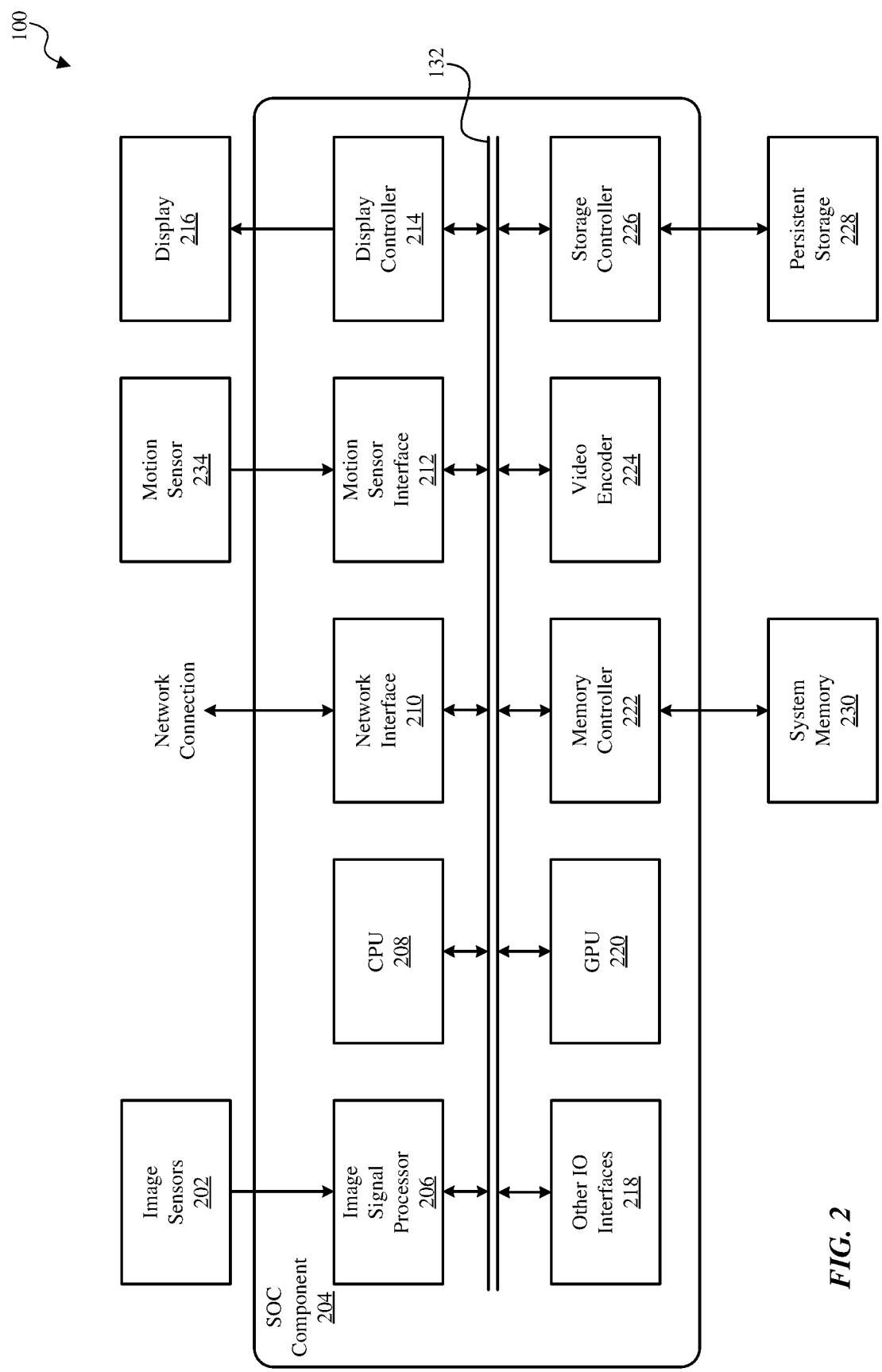
FIG. 2 is a block diagram illustrating components in the electronic device, according to one embodiment.

FIG. 2 is a block diagram illustrating components in device 100, according to one embodiment. Device 100 may perform various operations including image processing. For this and other purposes, the device 100 may include, among other components, image sensor 202, system-on-a chip (SOC) component 204, system memory 230, persistent storage (e.g., flash memory) 228, orientation sensor 234, and display 216. The components as illustrated in FIG. 2 are merely illustrative. For example, device 100 may include other components (such as speaker or microphone) that are not illustrated in FIG. 2. Further, some components (such as orientation sensor 234) may be omitted from device 100.

Image sensors 202 are components for capturing image data. Each of the image sensors 202 may be embodied, for example, as a complementary metal-oxide-semiconductor (CMOS) active-pixel sensor, a camera, video camera, or other devices. Image sensors 202 generate raw image data that is sent to SOC component 204 for further processing. In some embodiments, the image data processed by SOC component 204 is displayed on display 216, stored in system memory 230, persistent storage 228 or sent to a remote computing device via network connection. The raw image data generated by image sensors 202 may be in a Bayer color filter array (CFA) pattern (hereinafter also referred to as "Bayer pattern"). An image sensor 202 may also include optical and mechanical components that assist image sensing components (e.g., pixels) to capture images. The optical and mechanical components may include an aperture, a lens system, and an actuator that controls the lens position of the image sensor 202.

Motion sensor 234 is a component or a set of components for sensing motion of device 100. Motion sensor 234 may generate sensor signals indicative of orientation and/or acceleration of device 100. The sensor signals are sent to SOC component 204 for various operations such as turning on device 100 or rotating images displayed on display 216.

Display 216 is a component for displaying images as generated by SOC component 204. Display 216 may include, for example, liquid crystal display (LCD) device or an organic light emitting diode (OLED) device. Based on data received from SOC component 204, display 116 may display various images, such as menus, selected operating parameters, images captured by image sensor 202 and processed by SOC component 204, and/or other information received from a user interface of device 100 (not shown).

System memory 230 is a component for storing instructions for execution by SOC component 204 and for storing data processed by SOC component 204. System memory 230 may be embodied as any type of memory including, for example, dynamic random access memory (DRAM), synchronous DRAM (SDRAM), double data rate (DDR, DDR2, DDR3, etc.) RAMBUS DRAM (RDRAM), static RAM (SRAM) or a combination thereof. In some embodiments, system memory 230 may store pixel data or other image data or statistics in various formats.

Persistent storage 228 is a component for storing data in a non-volatile manner. Persistent storage 228 retains data even when power is not available. Persistent storage 228 may be embodied as read-only memory (ROM), flash memory or other non-volatile random access memory devices.

SOC component 204 is embodied as one or more integrated circuit (IC) chip and performs various data processing processes. SOC component 204 may include, among other subcomponents, image signal processor (ISP) 206, a central processor unit (CPU) 208, a network interface 210, motion sensor interface 212, display controller 214, graphics processor (GPU) 220, memory controller 222, video encoder 224, storage controller 226, and various other input/output (I/O) interfaces 218, and bus 232 connecting these subcomponents. SOC component 204 may include more or fewer subcomponents than those shown in FIG. 2.

ISP 206 is hardware that performs various stages of an image processing pipeline. In some embodiments, ISP 206 may receive raw image data from image sensor 202, and process the raw image data into a form that is usable by other subcomponents of SOC component 204 or components of device 100. ISP 206 may perform various image-manipulation operations such as image translation operations, horizontal and vertical scaling, color space conversion and/or image stabilization transformations, as described below in detail with reference to FIG. 3.

CPU 208 may be embodied using any suitable instruction set architecture, and may be configured to execute instructions defined in that instruction set architecture. CPU 208 may be general-purpose or embedded processors using any of a variety of instruction set architectures (ISAs), such as the x86, PowerPC, SPARC, RISC, ARM or MIPS ISAs, or any other suitable ISA. Although a single CPU is illustrated in FIG. 2, SOC component 204 may include multiple CPUs. In multiprocessor systems, each of the CPUs may commonly, but not necessarily, implement the same ISA.

Graphics processing unit (GPU) 220 is graphics processing circuitry for performing graphical data. For example, GPU 220 may render objects to be displayed into a frame buffer (e.g., one that includes pixel data for an entire frame). GPU 220 may include one or more graphics processors that may execute graphics software to perform a part or all of the graphics operation, or hardware acceleration of certain graphics operations.

I/O interfaces 218 are hardware, software, firmware or combinations thereof for interfacing with various input/output components in device 100. I/O components may include devices such as keypads, buttons, audio devices, and sensors such as a global positioning system. I/O interfaces 218 process data for sending data to such I/O components or process data received from such I/O components.

Network interface 210 is a subcomponent that enables data to be exchanged between devices 100 and other devices via one or more networks (e.g., carrier or agent devices). For example, video or other image data may be received from other devices via network interface 210 and be stored in system memory 230 for subsequent processing (e.g., via a back-end interface to image signal processor 206, such as discussed below in FIG. 3) and display. The networks may include, but are not limited to, Local Area Networks (LANs) (e.g., an Ethernet or corporate network) and Wide Area Networks (WANs). The image data received via network interface 210 may undergo image processing processes by ISP 206.

Motion sensor interface 212 is circuitry for interfacing with motion sensor 234. Motion sensor interface 212 receives sensor information from motion sensor 234 and processes the sensor information to determine the orientation or movement of the device 100.

Display controller 214 is circuitry for sending image data to be displayed on display 216. Display controller 214 receives the image data from ISP 206, CPU 208, graphic processor or system memory 230 and processes the image data into a format suitable for display on display 216.

Memory controller 222 is circuitry for communicating with system memory 230. Memory controller 222 may read data from system memory 230 for processing by ISP 206, CPU 208, GPU 220 or other subcomponents of SOC component 204. Memory controller 222 may also write data to system memory 230 received from various subcomponents of SOC component 204.

Video encoder 224 is hardware, software, firmware or a combination thereof for encoding video data into a format suitable for storing in persistent storage 128 or for passing the data to network interface w10 for transmission over a network to another device.

In some embodiments, one or more subcomponents of SOC component 204 or some functionality of these subcomponents may be performed by software components executed on ISP 206, CPU 208 or GPU 220. Such software components may be stored in system memory 230, persistent storage 228 or another device communicating with device 100 via network interface 210.

Image data or video data may flow through various data paths within SOC component 204. In one example, raw image data may be generated from the image sensors 202 and processed by ISP 206, and then sent to system memory 230 via bus 232 and memory controller 222. After the image data is stored in system memory 230, it may be accessed by video encoder 224 for encoding or by display 116 for displaying via bus 232.

In another example, image data is received from sources other than the image sensors 202. For example, video data may be streamed, downloaded, or otherwise communicated to the SOC component 204 via wired or wireless network. The image data may be received via network interface 210 and written to system memory 230 via memory controller 222. The image data may then be obtained by ISP 206 from system memory 230 and processed through one or more image processing pipeline stages, as described below in detail with reference to FIG. 3. The image data may then be returned to system memory 230 or be sent to video encoder 224, display controller 214 (for display on display 216), or storage controller 226 for storage at persistent storage 228.

Example Image Signal Processing Pipelines

Figure 3:
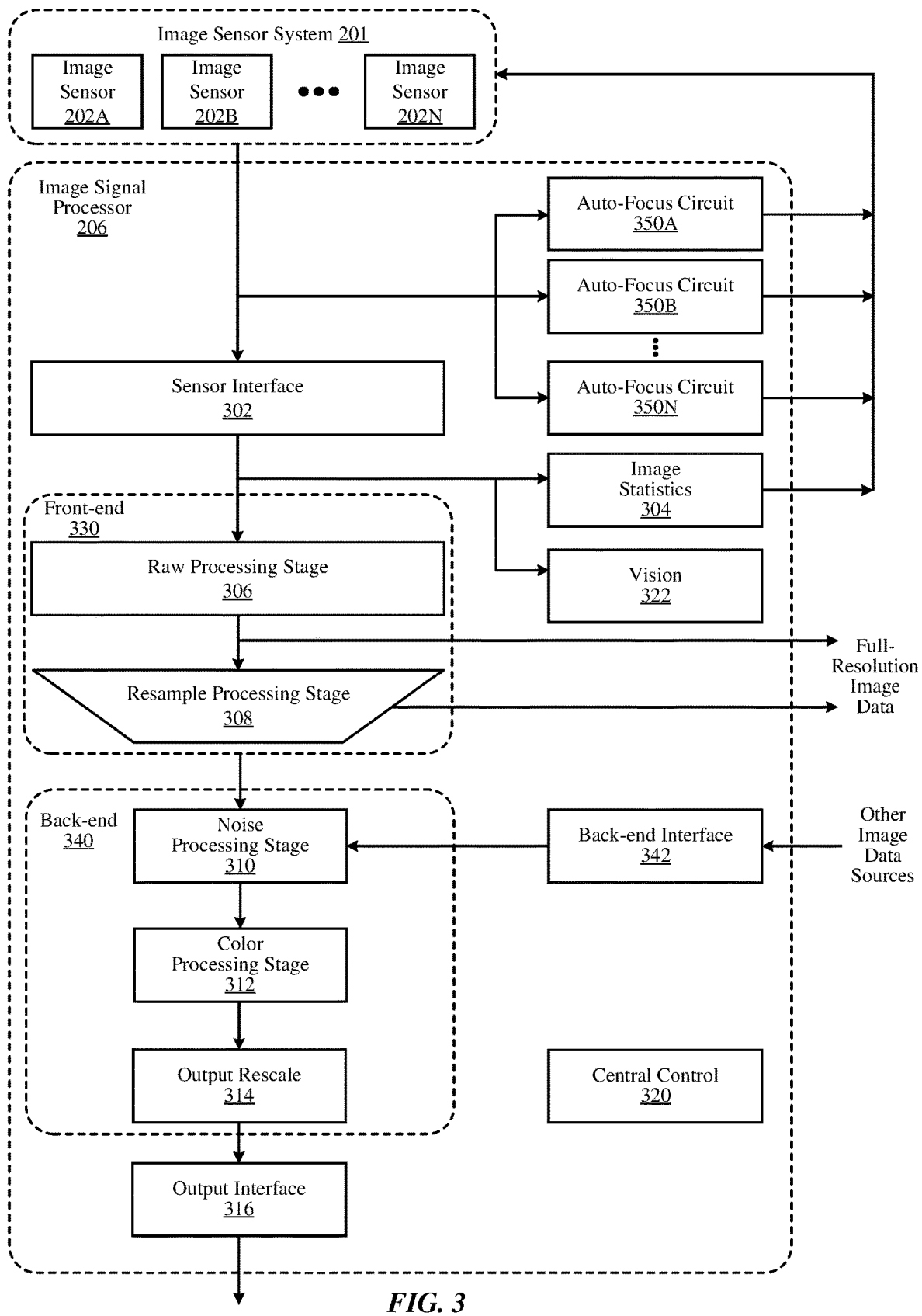
FIG. 3 is a block diagram illustrating image processing pipelines implemented using an image signal processor, according to one embodiment.

FIG. 3 is a block diagram illustrating image processing pipelines implemented using ISP 206, according to one embodiment. In the embodiment of FIG. 3, ISP 206 is coupled to an image sensor system 201 that includes one or more image sensors 202A through 202N (hereinafter collectively referred to as "image sensors 202" or also referred individually as "image sensor 202") to receive raw image data. The image sensor system 201 may include one or more sub-systems that control the image sensors 202 individually. In some cases, each image sensor 202 may operate independently while, in other cases, the image sensors 202 may share some components. For example, in one embodiment, two or more image sensors 202 may be share the same circuit board that controls the mechanical components of the image sensors (e.g., actuators that change the lens positions of each image sensor). The image sensing components of an image sensor 202 may include different types of image sensing components that may provide raw image data in different forms to the ISP 206. For example, in one embodiment, the image sensing components may include a plurality of focus pixels that are used for auto-focusing and a plurality of image pixels that are used for capturing images. In another embodiment, the image sensing pixels may be used for both auto-focusing and image capturing purposes.

ISP 206 implements an image processing pipeline which may include a set of stages that process image information from creation, capture or receipt to output. ISP 206 may include, among other components, sensor interface 302, central control 320, front-end pipeline stages 330, back-end pipeline stages 340, image statistics module 304, vision module 322, back-end interface 342, output interface 316, and auto-focus circuits 350A through 350N (hereinafter collectively referred to as "auto-focus circuits 350" or referred individually as "auto-focus circuits 350"). ISP 206 may include other components not illustrated in FIG. 3 or may omit one or more components illustrated in FIG. 3.

In one or more embodiments, different components of ISP 206 process image data at different rates. In the embodiment of FIG. 3, front-end pipeline stages 330 (e.g., raw processing stage 306 and resample processing stage 308) may process image data at an initial rate. Thus, the various different techniques, adjustments, modifications, or other processing operations performed by these front-end pipeline stages 330 at the initial rate. For example, if the front-end pipeline stages 330 process 2 pixels per clock cycle, then raw processing stage 306 operations (e.g., black level compensation, highlight recovery and defective pixel correction) may process 2 pixels of image data at a time. In contrast, one or more back-end pipeline stages 340 may process image data at a different rate less than the initial data rate. For example, in the embodiment of FIG. 3, back-end pipeline stages 340 (e.g., noise processing stage 310, color processing stage 312, and output rescale 314) may be processed at a reduced rate (e.g., 1 pixel per clock cycle).

Raw image data captured by image sensors 202 may be transmitted to different components of ISP 206 in different manners. In one embodiment, raw image data corresponding to the focus pixels may be sent to the auto-focus circuits 350 while raw image data corresponding to the image pixels may be sent to the sensor interface 302. In another embodiment, raw image data corresponding to both types of pixels may simultaneously be sent to both the auto-focus circuits 350 and the sensor interface 302.

Auto-focus circuits 350 may include hardware circuit that analyzes raw image data to determine an appropriate lens position of each image sensor 202. In one embodiment, the raw image data may include data that is transmitted from image sensing pixels that specializes in image focusing. In another embodiment, raw image data from image capture pixels may also be used for auto-focusing purpose. An auto-focus circuit 350 may perform various image processing operations to generate data that determines the appropriate lens position. The image processing operations may include cropping, binning, image compensation, scaling to generate data that is used for auto-focusing purpose. The auto-focusing data generated by auto-focus circuits 350 may be fed back to the image sensor system 201 to control the lens positions of the image sensors 202. For example, an image sensor 202 may include a control circuit that analyzes the auto-focusing data to determine a command signal that is sent to an actuator associated with the lens system of the image sensor to change the lens position of the image sensor. The data generated by the auto-focus circuits 350 may also be sent to other components of the ISP 206 for other image processing purposes. For example, some of the data may be sent to image statistics 304 to determine information regarding auto-exposure.

The auto-focus circuits 350 may be individual circuits that are separate from other components such as image statistics 304, sensor interface 302, front-end 330 and back-end 340. This allows the ISP 206 to perform auto-focusing analysis independent of other image processing pipelines. For example, the ISP 206 may analyze raw image data from the image sensor 202A to adjust the lens position of image sensor 202A using the auto-focus circuit 350A while performing downstream image processing of the image data from image sensor 202B simultaneously. In one embodiment, the number of auto-focus circuits 350 may correspond to the number of image sensors 202. In other words, each image sensor 202 may have a corresponding auto-focus circuit that is dedicated to the auto-focusing of the image sensor 202. The device 100 may perform auto focusing for different image sensors 202 even if one or more image sensors 202 are not in active use. This allows a seamless transition between two image sensors 202 when the device 100 switches from one image sensor 202 to another. For example, in one embodiment, a device 100 may include a wide-angle camera and a telephoto camera as a dual back camera system for photo and image processing. The device 100 may display images captured by one of the dual cameras and may switch between the two cameras from time to time. The displayed images may seamless transition from image data captured by one image sensor 202 to image data captured by another image sensor without waiting for the second image sensor 202 to adjust its lens position because two or more auto-focus circuits 350 may continuously provide auto-focus data to the image sensor system 201.

Raw image data captured by different image sensors 202 may also be transmitted to sensor interface 302. Sensor interface 302 receives raw image data from image sensor 202 and processes the raw image data into an image data processable by other stages in the pipeline. Sensor interface 302 may perform various preprocessing operations, such as image cropping, binning or scaling to reduce image data size. In some embodiments, pixels are sent from the image sensor 202 to sensor interface 302 in raster order (e.g., horizontally, line by line). The subsequent processes in the pipeline may also be performed in raster order and the result may also be output in raster order. Although only a single image sensor and a single sensor interface 302 are illustrated in FIG. 3, when more than one image sensor is provided in device 100, a corresponding number of sensor interfaces may be provided in ISP 206 to process raw image data from each image sensor.

Front-end pipeline stages 330 process image data in raw or full-color domains. Front-end pipeline stages 330 may include, but are not limited to, raw processing stage 306 and resample processing stage 308. A raw image data may be in Bayer raw format, for example. In Bayer raw image format, pixel data with values specific to a particular color (instead of all colors) is provided in each pixel. In an image capturing sensor, image data is typically provided in a Bayer pattern. Raw processing stage 306 may process image data in a Bayer raw format.

The operations performed by raw processing stage 306 include, but are not limited, sensor linearization, black level compensation, fixed pattern noise reduction, defective pixel correction, raw noise filtering, lens shading correction, white balance gain, and highlight recovery. Sensor linearization refers to mapping non-linear image data to linear space for other processing. Black level compensation refers to providing digital gain, offset and clip independently for each color component (e.g., Gr, R, B, Gb) of the image data. Fixed pattern noise reduction refers to removing offset fixed pattern noise and gain fixed pattern noise by subtracting a dark frame from an input image and multiplying different gains to pixels. Defective pixel correction refers to detecting defective pixels, and then replacing defective pixel values. Raw noise filtering refers to reducing noise of image data by averaging neighbor pixels that are similar in brightness. Highlight recovery refers to estimating pixel values for those pixels that are clipped (or nearly clipped) from other channels. Lens shading correction refers to applying a gain per pixel to compensate for a dropoff in intensity roughly proportional to a distance from a lens optical center. White balance gain refers to providing digital gains for white balance, offset and clip independently for all color components (e.g., Gr, R, B, Gb in Bayer format). Components of ISP 206 may convert raw image data into image data in full-color domain, and thus, raw processing stage 306 may process image data in the full-color domain in addition to or instead of raw image data.

Resample processing stage 308 performs various operations to convert, resample, or scale image data received from raw processing stage 306. Operations performed by resample processing stage 308 may include, but not limited to, demosaic operation, per-pixel color correction operation, Gamma mapping operation, color space conversion and downscaling or sub-band splitting. Demosaic operation refers to converting or interpolating missing color samples from raw image data (for example, in a Bayer pattern) to output image data into a full-color domain. Demosaic operation may include low pass directional filtering on the interpolated samples to obtain full-color pixels. Per-pixel color correction operation refers to a process of performing color correction on a per-pixel basis using information about relative noise standard deviations of each color channel to correct color without amplifying noise in the image data. Gamma mapping refers to converting image data from input image data values to output data values to perform gamma correction. For the purpose of Gamma mapping, lookup tables (or other structures that index pixel values to another value) for different color components or channels of each pixel (e.g., a separate lookup table for R, G, and B color components) may be used. Color space conversion refers to converting color space of an input image data into a different format. In one embodiment, resample processing stage 308 converts RGB format into YCbCr format for further processing.

Central control module 320 may control and coordinate overall operation of other components in ISP 206. Central control module 320 performs operations including, but not limited to, monitoring various operating parameters (e.g., logging clock cycles, memory latency, quality of service, and state information), updating or managing control parameters for other components of ISP 206, and interfacing with sensor interface 302 to control the starting and stopping of other components of ISP 206. For example, central control module 320 may update programmable parameters for other components in ISP 206 while the other components are in an idle state. After updating the programmable parameters, central control module 320 may place these components of ISP 206 into a run state to perform one or more operations or tasks. Central control module 320 may also instruct other components of ISP 206 to store image data (e.g., by writing to system memory 230 in FIG. 2) before, during, or after resample processing stage 308. In this way full- resolution image data in raw or full-color domain format may be stored in addition to or instead of processing the image data output from resample processing stage 308 through backend pipeline stages 340.

Image statistics module 304 performs various operations to collect statistic information associated with the image data. The operations for collecting statistics information may include, but not limited to, sensor linearization, replace patterned defective pixels, sub-sample raw image data, detect and replace non-patterned defective pixels, black level compensation, lens shading correction, and inverse black level compensation. After performing one or more of such operations, statistics information such as 3A statistics (Auto white balance (AWB), auto exposure (AE), histograms (e.g., 2D color or component) and any other image data information may be collected or tracked. In some embodiments, certain pixels' values, or areas of pixel values may be excluded from collections of certain statistics data when preceding operations identify clipped pixels. Although only a single statistics module 304 is illustrated in FIG. 3, multiple image statistics modules may be included in ISP 206. For example, each image sensor 202 may correspond to an individual image statistics unit 304. In such embodiments, each statistic module may be programmed by central control module 320 to collect different information for the same or different image data.

Vision module 322 performs various operations to facilitate computer vision operations at CPU 208 such as facial detection in image data. The vision module 322 may perform various operations including pre-processing, global tone-mapping and Gamma correction, vision noise filtering, resizing, keypoint detection, generation of histogram-of-orientation gradients (HOG) and normalized cross correlation (NCC). The pre-processing may include subsampling or binning operation and computation of luminance if the input image data is not in YCrCb format. Global mapping and Gamma correction can be performed on the pre-processed data on luminance image. Vision noise filtering is performed to remove pixel defects and reduce noise present in the image data, and thereby, improve the quality and performance of subsequent computer vision algorithms. Such vision noise filtering may include detecting and fixing dots or defective pixels, and performing bilateral filtering to reduce noise by averaging neighbor pixels of similar brightness. Various vision algorithms use images of different sizes and scales. Resizing of an image is performed, for example, by binning or linear interpolation operation. Keypoints are locations within an image that are surrounded by image patches well suited to matching in other images of the same scene or object. Such keypoints are useful in image alignment, computing camera pose and object tracking. Keypoint detection refers to the process of identifying such keypoints in an image. HOG provides descriptions of image patches for tasks in mage analysis and computer vision. HOG can be generated, for example, by (i) computing horizontal and vertical gradients using a simple difference filter, (ii) computing gradient orientations and magnitudes from the horizontal and vertical gradients, and (iii) binning the gradient orientations. NCC is the process of computing spatial cross-correlation between a patch of image and a kernel.

Back-end interface 342 receives image data from other image sources than image sensor 102 and forwards it to other components of ISP 206 for processing. For example, image data may be received over a network connection and be stored in system memory 230. Back-end interface 342 retrieves the image data stored in system memory 230 and provides it to back-end pipeline stages 340 for processing.

One of many operations that are performed by back-end interface 342 is converting the retrieved image data to a format that can be utilized by back-end processing stages 340. For instance, back-end interface 342 may convert RGB, YCbCr 4:2:0, or YCbCr 4:2:2 formatted image data into YCbCr 4:4:4 color format.

Back-end pipeline stages 340 processes image data according to a particular full-color format (e.g., YCbCr 4:4:4 or RGB). In some embodiments, components of the back-end pipeline stages 340 may convert image data to a particular full-color format before further processing. Back-end pipeline stages 340 may include, among other stages, noise processing stage 310 and color processing stage 312. Back-end pipeline stages 340 may include other stages not illustrated in FIG. 3.

Noise processing stage 310 performs various operations to reduce noise in the image data. The operations performed by noise processing stage 310 include, but are not limited to, color space conversion, gamma/de-gamma mapping, temporal filtering, noise filtering, luma sharpening, and chroma noise reduction. The color space conversion may convert an image data from one color space format to another color space format (e.g., RGB format converted to YCbCr format). Gamma/de-gamma operation converts image data from input image data values to output data values to perform gamma correction or reverse gamma correction. Temporal filtering filters noise using a previously filtered image frame to reduce noise. For example, pixel values of a prior image frame are combined with pixel values of a current image frame. Noise filtering may include, for example, spatial noise filtering. Luma sharpening may sharpen luma values of pixel data while chroma suppression may attenuate chroma to gray (e.g. no color). In some embodiment, the luma sharpening and chroma suppression may be performed simultaneously with spatial nose filtering. The aggressiveness of noise filtering may be determined differently for different regions of an image. Spatial noise filtering may be included as part of a temporal loop implementing temporal filtering. For example, a previous image frame may be processed by a temporal filter and a spatial noise filter before being stored as a reference frame for a next image frame to be processed. In other embodiments, spatial noise filtering may not be included as part of the temporal loop for temporal filtering (e.g., the spatial noise filter may be applied to an image frame after it is stored as a reference image frame and thus the reference frame is not spatially filtered.

Color processing stage 312 may perform various operations associated with adjusting color information in the image data. The operations performed in color processing stage 312 include, but are not limited to, local tone mapping, gain/offset/clip, color correction, three-dimensional color lookup, gamma conversion, and color space conversion. Local tone mapping refers to spatially varying local tone curves in order to provide more control when rendering an image. For instance, a two-dimensional grid of tone curves (which may be programmed by the central control module 320) may be bi-linearly interpolated such that smoothly varying tone curves are created across an image. In some embodiments, local tone mapping may also apply spatially varying and intensity varying color correction matrices, which may, for example, be used to make skies bluer while turning down blue in the shadows in an image. Digital gain/offset/clip may be provided for each color channel or component of image data. Color correction may apply a color correction transform matrix to image data. 3D color lookup may utilize a three dimensional array of color component output values (e.g., R, G, B) to perform advanced tone mapping, color space conversions, and other color transforms. Gamma conversion may be performed, for example, by mapping input image data values to output data values in order to perform gamma correction, tone mapping, or histogram matching. Color space conversion may be implemented to convert image data from one color space to another (e.g., RGB to YCbCr). Other processing techniques may also be performed as part of color processing stage 312 to perform other special image effects, including black and white conversion, sepia tone conversion, negative conversion, or solarize conversion.

Output rescale module 314 may resample, transform and correct distortion on the fly as the ISP 206 processes image data. Output rescale module 314 may compute a fractional input coordinate for each pixel and uses this fractional coordinate to interpolate an output pixel via a polyphase resampling filter. A fractional input coordinate may be produced from a variety of possible transforms of an output coordinate, such as resizing or cropping an image (e.g., via a simple horizontal and vertical scaling transform), rotating and shearing an image (e.g., via non-separable matrix transforms), perspective warping (e.g., via an additional depth transform) and per-pixel perspective divides applied in piecewise in strips to account for changes in image sensor during image data capture (e.g., due to a rolling shutter), and geometric distortion correction (e.g., via computing a radial distance from the optical center in order to index an interpolated radial gain table, and applying a radial perturbance to a coordinate to account for a radial lens distortion).

Output rescale module 314 may apply transforms to image data as it is processed at output rescale module 314. Output rescale module 314 may include horizontal and vertical scaling components. The vertical portion of the design may implement series of image data line buffers to hold the "support" needed by the vertical filter. As ISP 206 may be a streaming device, it may be that only the lines of image data in a finite-length sliding window of lines are available for the filter to use. Once a line has been discarded to make room for a new incoming line, the line may be unavailable. Output rescale module 314 may statistically monitor computed input Y coordinates over previous lines and use it to compute an optimal set of lines to hold in the vertical support window. For each subsequent line, output rescale module may automatically generate a guess as to the center of the vertical support window. In some embodiments, output rescale module 314 may implement a table of piecewise perspective transforms encoded as digital difference analyzer (DDA) steppers to perform a per-pixel perspective transformation between a input image data and output image data in order to correct artifacts and motion caused by sensor motion during the capture of the image frame. Output rescale may provide image data via output interface 316 to various other components of device 100, as discussed above with regard to FIGS. 1 and 2.

In various embodiments, the functionally of components 302 through 350 may be performed in a different order than the order implied by the order of these functional units in the image processing pipeline illustrated in FIG. 3, or may be performed by different functional components than those illustrated in FIG. 3. Moreover, the various components as described in FIG. 3 may be embodied in various combinations of hardware, firmware or software.

Example Pipelines for Image Fusion

Figure 4:
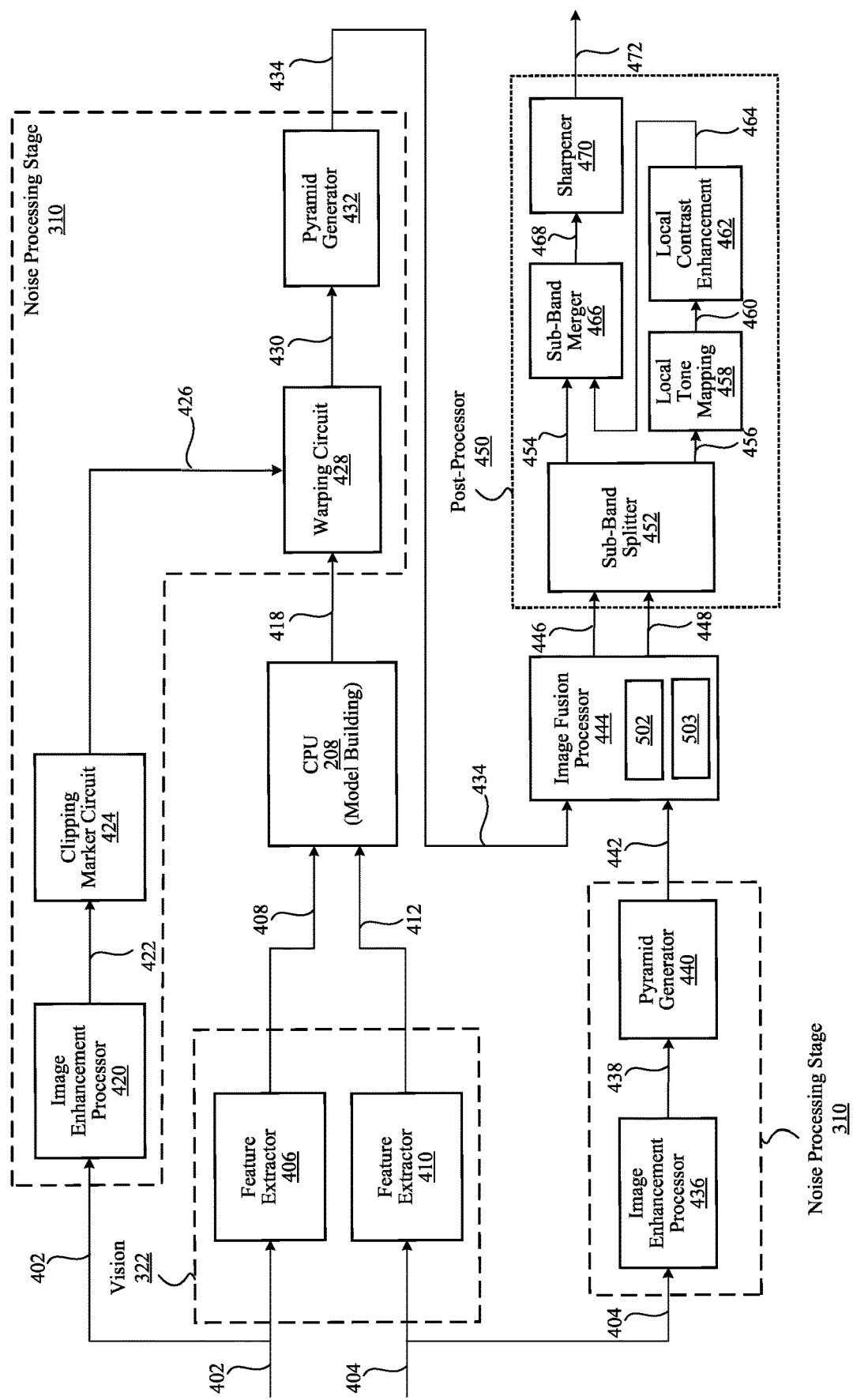
FIG. 4 is a block diagram illustrating a portion of the image processing pipeline, according to one embodiment.

FIG. 4 is a block diagram illustrating a portion of the image processing pipeline including circuitry for image fusion, according to one embodiment. Images 402, 404 are captured by image sensor system 201 and passed onto vision module 322. In one embodiment, image 402 is captured shortly before or after capturing image 404. Alternatively, images 402 and 404 are captured at the same time using two different image sensors 202 with different exposure times. Image 402 captures a scene with a first exposure time, and image 404 captures the same scene with a second exposure time that may be different than the first exposure time. If the second exposure time is shorter than the first exposure time, image 402 can be referred to as "long exposure image" and image 404 can be referred to as "short exposure image." Each image 402, 404 includes multiple color components, e.g., luma and chroma color components. Image 402 is passed onto feature extractor circuit 406 of vision module 322 for processing and feature extraction. Image 404 may be passed onto feature extractor circuit 410 of vision module 322 for processing and feature extraction. Alternatively, feature extractor circuit 410 may be turned off.

Feature extractor circuit 406 extracts first keypoint information 408 about first keypoints (e.g., salient points) in image 402 by processing pixel values of pixels in image 402. The first keypoints are related to certain distinguishable features (also referred to "salient points") in image 402. Extracted first keypoint information 408 can include information about spatial locations (e.g., coordinates) of at least a subset of pixels in image 402 associated with the first keypoints of image 402. For each of the first keypoints in image 402, feature extractor circuit 406 may also extract and encode a keypoint descriptor, which includes a keypoint scale and orientation information. Thus, first keypoint information 408 extracted by feature extractor circuit 406 may include information about a spatial location of each of the first keypoints of image 402 and a keypoint descriptor of each of the first keypoints of image 402. First keypoint information 408 associated with at least the subset of pixels of image 402 is passed onto CPU 208 for processing.

Feature extractor circuit 410 extracts second keypoint information 412 about second keypoints in image 404 by processing pixel values of pixels in image 404. The second keypoints are related to certain distinguishable features (e.g., salient points) in image 404. Extracted second keypoint information 412 can include information about spatial locations (e.g., coordinates) of at least a subset of pixels in image 404 associated with the second keypoints of image 404. For each of the second keypoints in image 404, feature extractor circuit 410 may also extract and encode a keypoint descriptor, which includes a keypoint scale and orientation information. Thus, second keypoint information 412 extracted by feature extractor circuit 410 may include information about a spatial location of each of the second keypoints of image 404 and a keypoint descriptor of each of the second keypoints of image 404. Second keypoint information 412 associated with at least the subset of pixels of image 404 are passed onto CPU 208 for processing. Alternatively (not shown in FIG. 4), feature extractor circuit 410 is turned off. In such case, second keypoints of image 404 are not extracted and only first keypoint information 408 is passed onto CPU 208 for processing.

CPU 208 builds a model indicating correspondence between image 402 and image 404. CPU 208 applies a cross correlation between first keypoint information 408 of image 402 and second keypoint information 412 of image 404 to generate at least one motion vector representing relative movement in image 402 and image 404. In one embodiment, CPU 208 correlates (matches) first keypoint information 408 with second keypoint information 412, e.g., by comparing and pairing keypoint descriptors extracted from images 402 and 404 to determine a set of keypoint information matches (e.g., pairs of keypoint descriptors extracted from images 402 and 404). CPU 208 then performs a model fitting algorithm by processing the determined set of keypoint information matches to build the model. The model fitting algorithm may be designed to discard false matches during the model building process. The model fitting algorithm may be based on, e.g., the iterative random sample consensus (RANSAC) algorithm. The model built by CPU 208 includes information about mapping between pixels in the images 402 and 404. The model may represent a linear, affine and perspective transformation. Alternatively, the model may be a non-linear transformation. Based on the model, warping parameters (mapping information) 418 may be generated by CPU 208 and sent to warping circuit 428 for spatial transformation of image 402 and/or image 404. Warping parameters 418 can be used in a form of a matrix for spatial transformation (e.g., warping) of image 402 and/or image 404. The matrix for spatial transformation represents a geometric transformation matrix or a mesh grid with motion vectors defined for every grid point. Alternatively, a dedicated circuit instead of CPU 208 may be provided to perform the RANSAC algorithm and to generate warping parameters 418.

In the embodiment when feature extractor circuit 410 is turned off and only first keypoint information 408 is passed onto CPU 208, CPU 208 generates a motion vector for each of the first keypoints of image 402. This is done by performing, e.g., the NCC search using a predefined kernel to determine a best feature match within a defined spatial vicinity (patch) of each first keypoint of image 402. In such case, CPU 208 performs a model fitting algorithm (e.g., the RANSAC algorithm) that uses first keypoint information 408 (e.g., coordinates of the first keypoints) and corresponding motion vectors determined based on feature matches to build a model, whereas matching of keypoints between images 402 and 404 is not performed. The model fitting algorithm may be designed to discard false feature matches. Based on the built model, CPU 208 generates warping parameters (mapping information) 418 that is sent to warping circuit 428 for spatial transformation of image 402. Alternatively, a dedicated circuit instead of CPU 208 may be provided to perform the NCC search and to generate a motion vector for each of the first keypoints of image 402. In such case, CPU 208 uses the motion vector for each of the first keypoints generated by the dedicated circuit to build the model.

Image 402, which may be a long exposure image, is also passed onto image enhancement processor 420 that performs certain processing of image 402, e.g., noise removal, enhancement, etc., to obtain processed version 422 of image 402. Processed version 422 is passed onto clipping marker circuit 424. Clipping marker circuit 424 identifies clipped (e.g., oversaturated) pixels in processed version 422 of image 402 having one or more color component values that exceed threshold values as clipping markers. Clipping marker circuit 424 may replace the pixel values with predetermined pixel values so that any of these pixels or any other pixel derived from these pixels downstream from clipping marker circuit 424 can be identified and addressed appropriately in subsequent processing, such as corresponding morphological operations (e.g., erosion or dilation) of the clipping markers. For example, the morphological operations can be conducted during a warping operation performed by warping circuit 428, during a pyramid generation performed by pyramid generator circuit 432, and/or during a fusion operation performed by image fusion processor 444, e.g., during upscaling and extracting of high frequency components in multi-scale image fusion circuit 502 of FIG. 5A and in image fusion circuit 503 of FIG. 5B.

Warping circuit 428 accommodates the linear and non-linear transformations defined by the model generated by CPU 208. Warping circuit 428 warps processed image 426 using the mapping information according to the warping parameters 418 to generate warped version 430 of image 402 (e.g., warped image 430) spatially more aligned to image 404 than to image 402. Alternatively (not shown in FIG. 4), warping circuit 428 warps image 404 using the mapping information in model 418 to generate warped version 430 of image 404 spatially more aligned to image 402 than to image 404. Warped image 430 generated by warping circuit 428 is then passed onto pyramid generator circuit 432.

Pyramid generator circuit 432 generates multiple downscaled warped images each having a different resolution by sequentially downscaling warped image 430. Each downscaled warped image includes the multiple color components. The downscaled warped images obtained from warped image 430 may be stored in e.g., system memory 230 (not shown in FIG. 4). Low frequency components of the downscaled warped images and a low frequency component of an unscaled single color version (e.g., luma component) of warped image 430 are passed as warped image data 434 onto image fusion processing circuit 444 for fusion with corresponding image data 442 obtained from image 404. Note that image enhancement processor 420, clipping locator circuit 424, warping circuit 428, and pyramid generator circuit 432 are part of noise processing stage 310.

Image enhancement processor 436 performs certain processing of image 404 (e.g., noise removal, enhancement, etc.) to obtain processed image 438 for passing onto pyramid generator circuit 440. Pyramid generator circuit 440 generates multiple downscaled images each having a different resolution by sequentially downscaling processed image 438. Each downscaled image generated by pyramid generator circuit 440 includes the multiple color components (e.g., luma and chroma components). The downscaled images obtained from processed image 438 may be stored in, e.g., system memory 230. Low frequency components of the downscaled images and a low frequency component of an unscaled single color version (e.g., luma component) of processed image 438 are passed onto image fusion processing circuit 444 as image data 442. Note that image enhancement processor 436 and pyramid generator circuit 440 are also part of noise processing stage 310.

Image fusion processing circuit 444 performs per pixel blending between a portion of warped image data 434 related to the unscaled single color version of warped image 430 with a portion of image data 442 related to the unscaled single color version of processed image 438 to generate unscaled single color version of fused image 446. Image fusion processing circuit 444 also performs per pixel blending between a portion of warped image data 434 related to a downscaled warped image (obtained by downscaling warped image 430) and a portion of image data 442 related to a corresponding downscaled image (obtained by downscaling processed image 438) to generate first downscaled version 448 of the fused image comprising the multiple color components. First downscaled version 448 has a pixel resolution equal to a quarter of a pixel resolution of unscaled single color version 446. Unscaled single color version 446 and first downscaled version 448 are passed onto post-processing circuit 450 for further processing and enhancement. Image fusion processing circuit 444 includes multi-scale image fusion circuit 502 shown in FIG. 5A and image fusion circuit 503 shown in FIG. 5B. More details about structure and operation of image fusion processing circuit 444 are provided below in detail in conjunction with FIGS. 5A-5B and FIGS. 6A-6B.

Post-processing circuit 450 is part of color processing stage 312 and performs post-processing of unscaled single color version 446 and first downscaled version 448 to obtain post-processed fused image 472. Post-processing circuit 450 includes sub-band splitter (SBS) circuit 452, local tone mapping (LTM) circuit 458, local contrast enhancement (LCE) circuit 462, sub-band merger (SBM) circuit 466 and sharpening circuit 470. SBS circuit 452 performs sub-band splitting of unscaled single color version 446 to generate high frequency component of unscaled single color version 454 passed onto SBM circuit 466. SBS circuit 452 also performs sub-band splitting of first downscaled version 448 to generate low frequency component of first downscaled version 456 passed onto LTM circuit 458. LTM circuit 458 performs LTM operation on low frequency component of first downscaled version 456 to generate processed version of low frequency component of first downscaled version 460 passed onto LCE circuit 462. LCE circuit 462 performs local photometric contrast enhancement of a single color component (e.g., luma component) of processed version of low frequency component of first downscaled version 460 to generate enhanced version of first downscaled version of fused image 464. SBM circuit 466 merges high frequency component of unscaled single color version 454 and enhanced version of first downscaled version of fused image 464 to generate merged fused image data 468 passed onto sharpening circuit 470. Sharpening circuit 470 performs sharpening (e.g., photometric contrast enhancement) on a single color component (e.g., luma component) of merged fused image data 468 to generate post-processed fused image 472. Post-processed fused image 472 can be passed to output rescale 314 and then output interface 316. The processing performed at post-processing circuit 450 is merely an example, and various other post-processing may be performed as an alternative or as an addition to the processing at post processing circuit 450.

Example Architecture of Sharpener Circuit

Figure 5:
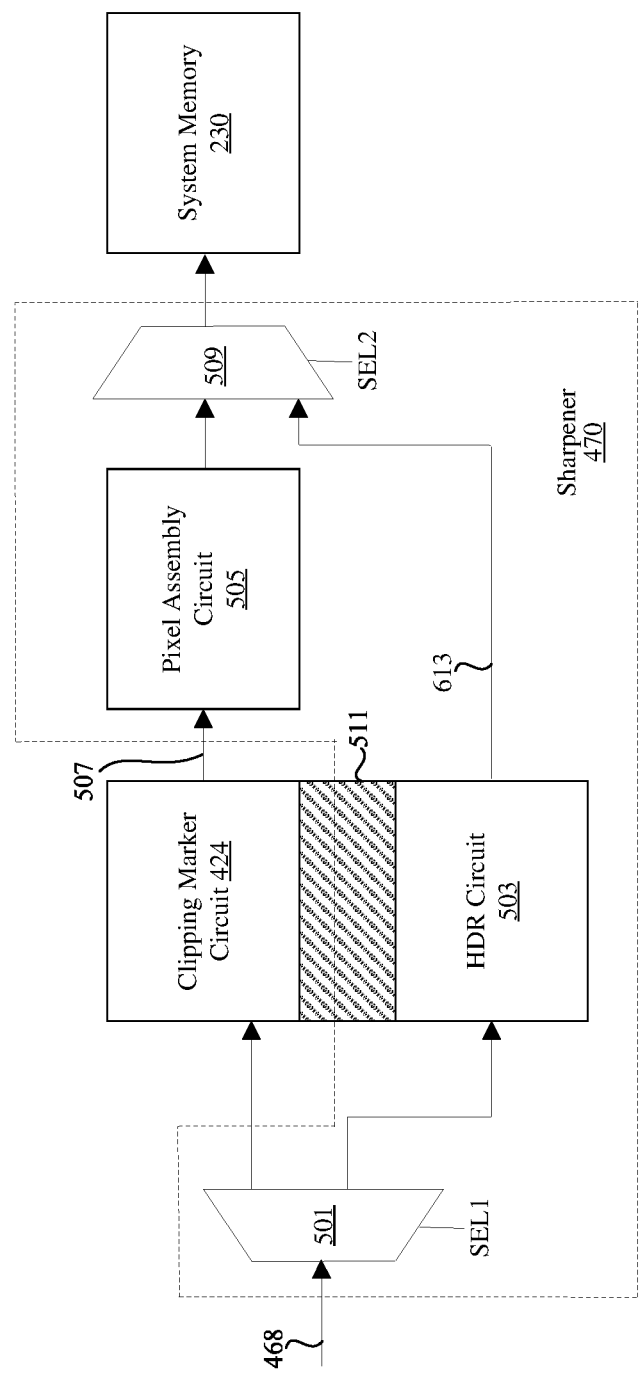
FIG. 5 is a detailed block diagram of a sharpener/HDR circuit, according to one embodiment.

FIG. 5 is a detailed block diagram of the sharpener circuit 470 according to one embodiment. The sharpener circuit 470 includes, among other components, a multiplexor 501, a HDR circuit 503, a pixel assembly circuit 505, and a multiplexor 509 according to one embodiment. One or more of these components may be removed or replaced with different components.

The multiplexor 501 is a circuit that receives the merged fused image data 468 generated by the sub-band merger 466, as described above with reference to FIG. 4. In one embodiment, the merged fused image data 468 is in a YCbCr 4:4:4 color format. The multiplexor 501 outputs a component of the merged fused image data (e.g., either Y, Yb, or Cr) to either the clipping market circuit 424 or the HDR circuit 503 based on a selection signal SEL.

The clipping marker circuit 424 identifies clipped pixels in the merged fused image data 468 having one or more color component values that exceed threshold values. The clipping marker circuit 424 replaces the pixel values with predetermined pixel values so that any of these pixels or any other pixel derived from these pixels downstream from the clipping marker circuit 424 can be identified and addressed appropriately in subsequent processing. The merged fused image data 468 with the clipped pixels is clipped fused image data 507 and is output to the pixel assembly 505.

The pixel assembly circuit 505 receives the clipped fused image data 507 from the clipping marker circuit 424 and assembles the clipped fused image data 507 into a format for writing to system memory 230. In one embodiment, the pixel assembly 505 creates a tiled version of the clipped fused image data 507 for storage in system memory 230. The tiled version of the clipped fused image data 507 can be read by the warping circuit 428 to perform more efficient memory-to-memory warping.

The HDR circuit 503 converts pixel values of the merged fused image data 468 (e.g., the input image pixel values) into output image pixel values. The output image pixel values can be stored in the system memory 230 for further processing and/or display on display 216. In one embodiment, the HDR circuit 503 converts the pixel values of the merged fused image data 468 using a color conversion function. The color conversion function maps an input image pixel value from the merged fused image data 468 to a corresponding output pixel conversion value for HDR format. The color conversion function can be any function used to map an input image pixel value to an output pixel conversion value. For example, the color conversion may be an inverse of electro optical transfer function, (EOTF$^{-1}$ function) that complies with the BT.2100 standard for HDR displays. Alternatively, the color conversion function can be a power function.

In one embodiment, the clipping marker circuit 424 and the HDR circuit 503 share line buffers 511 that cache the image data received by the clipping marker circuit 424 and the HDR circuit 503. Having a shared line buffer 511 is advantageous, among other reasons, because memory for the sharpener can be reduced.

Figure 6:
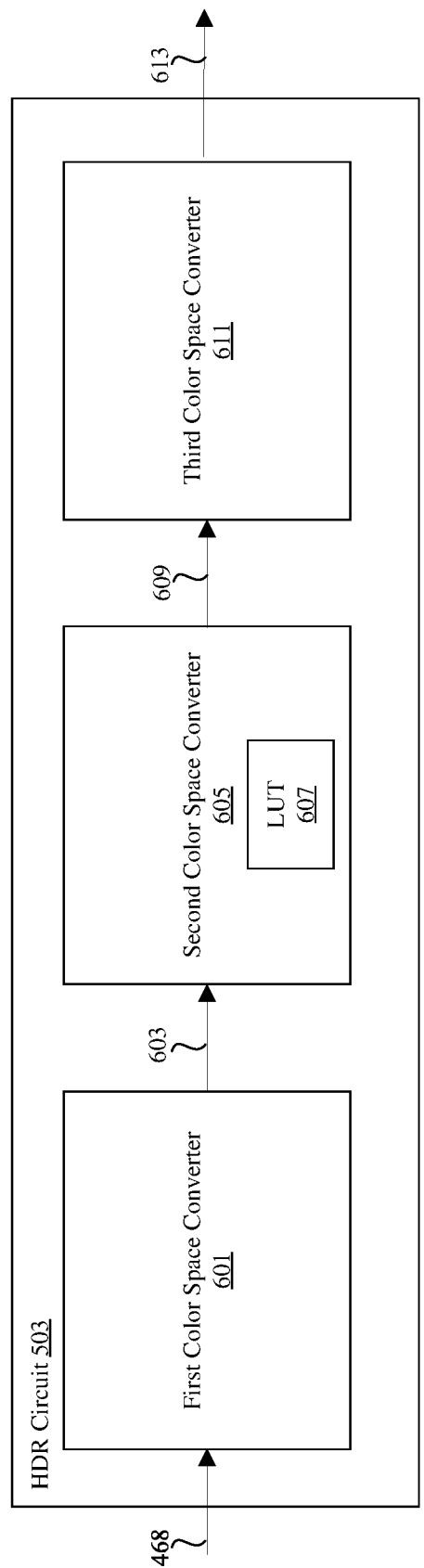
FIG. 6 is a detailed block diagram of a HDR circuit, according to one embodiment.

FIG. 6 is a detailed block diagram of the HDR circuit 503, according to one embodiment. The HDR circuit 503 includes, among other components, a first color space converter 601, a second color space converter 605, and a third color space converter 611. The first color space converter 601 receives the merged fused image data 468. The merged fused image data 468 may be in a YCbCr color format or other non-HDR formats. The first color space converter 601 converts the merged fused image data 468 into a different color space. In one embodiment, the first color space converter 601 converts the merged fused image data 468 in the YCbCr color format to the LMS color space. In one embodiment, the first color space converter 601 may first convert the merged fused image data 468 in YCbCr color format to the RGB color space and then convert the merged fused image data in the RGB color space to the LMS color space. The first color space converter 601 outputs the converted image data 603 in the LMS color space to the second color space converter 605.

Figure 7A:
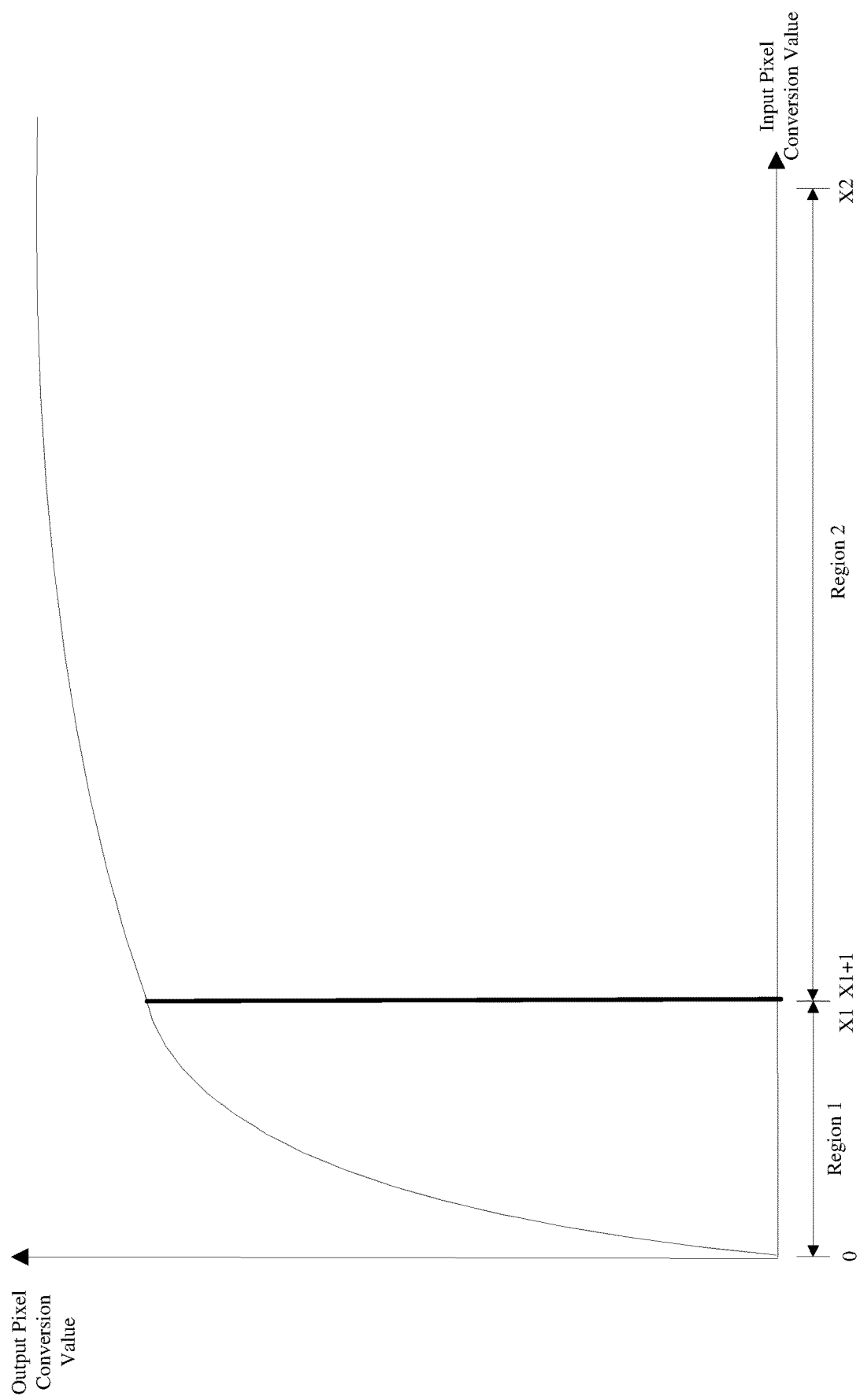
FIGS. 7A, 7B, and 7C are diagrams of a color conversion function, according to one embodiment.

The second color space converter 605 converts the converted image data 603 according to the color conversion function (e.g., EOTF$^{-1}$ function). FIG. 7A is an example color conversion function according to one embodiment. The X-axis of the color conversion function represents the input pixel conversion values that correspond to input image pixel values of the merged fused image data 468 in the LMS color space. The Y-axis of the color conversion function represents the output pixel conversion values (e.g., color converted values) where each output pixel conversion value corresponds to one input pixel conversion value. The output pixel conversion values of the color conversion function are used to convert the input pixel values of an image into color converted versions of the input pixel values for display on display 100.

In one embodiment, the input pixel conversion values of the color conversion function are grouped into two regions: Region 1 and Region 2. Region 1 (e.g., a first input range) of the color conversion function is used to convert input image pixel values from zero signal to input image pixel value X1 into their corresponding output pixel conversion value. Region 2 (e.g., a second input range) of the color conversion function is used to convert input image pixel values X1+1 to X2 into their corresponding output pixel conversion value.

The input image pixel values in Region 1 of the color conversion function can cause distortion when input image pixel values in Region 1 are converted using linear interpolation due to the steepness of the color conversion function in Region 1. To address the issue, the second color space converter 605 includes a lookup table (LUT) 607 that stores output pixel conversion values for each and every input pixel conversion value in Region 1. In one embodiment, the LUT 607 is embodied as a memory circuit.

In one embodiment, the LUT 607 stores a mapping of output pixel conversion values for all input image pixel values in Region 1 of the color conversion function. For each pixel in the converted image data 603 having an input image pixel value in Region 1 of the color conversion function, the second color space converter 605 accesses the LUT 607 to identify the output pixel conversion value that maps to the input image pixel value of the image. The output pixel conversion value that maps to the input image pixel value is a color converted version of the input image pixel value. Note that the LUT 607 may have multiple conversion tables for the different color components in the LMS color space if the L, M, S components have different color conversion functions. That is, the LUT 607 may have a conversion table for the "L" component, the "M" component, and the "S" component of the converted image data 603, respectively. In another embodiment, the LUT 607 has a single conversion table for the L, M, and S components if the color conversion function for the L, M, and S components are the same.

In one embodiment, the LUT 607 also stores output pixel conversion values for input image pixel values in Region 2 of the color conversion function. However, unlike for Region 1 of the color conversion function, the LUT 607 stores output pixel conversion values for a subset of all possible input pixel conversion values in Region 2 of the color conversion function. The portion of the LUT 607 corresponding to Region 2 of the color conversion function may have input pixel conversion values spaced apart by a power of two and their corresponding output pixel conversion values. That is, adjacent ones of the subset of input pixel values in Region 2 have intervals of power of two. In contrast, LUT 607 stores for Region 1 of the color conversion function each input pixel conversion value in Region 1 and its corresponding output pixel conversion value as described above.

Figure 7B:
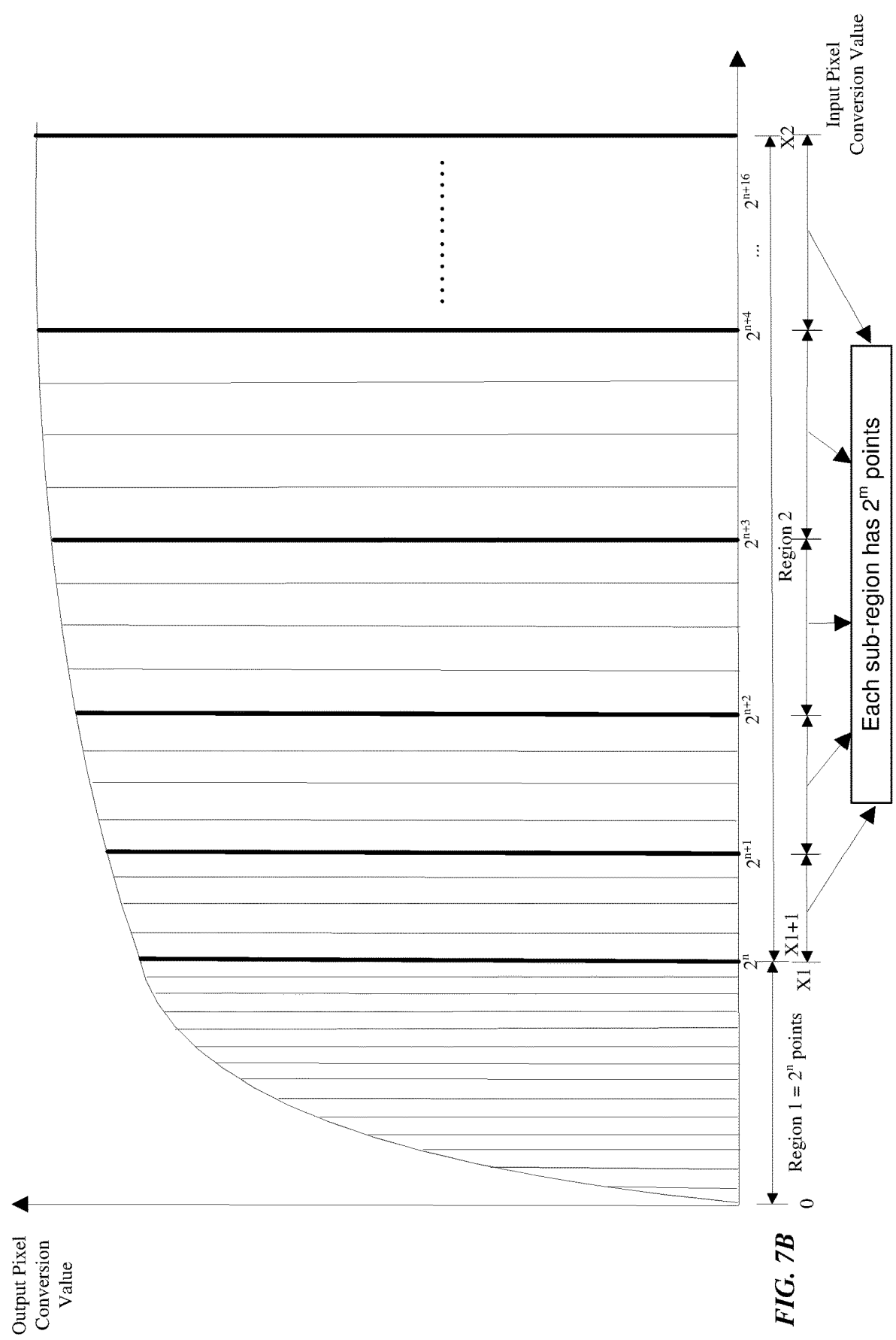

FIG. 7B illustrates the spacing of input pixel conversion values in Region 1 and Region 2. Region 1 may include any number of points that satisfy all possible input pixel conversion values in Region 1 of the color conversion function. For example, Region 1 may have $2^n$ points where n is a positive natural number.

Region 2 in contrast is divided into multiple sub-regions where each sub-region has the same amount of points that are representative of the input pixel conversion values in the sub-region of Region 2. In one embodiment, Region 2 is divided into multiple sub-regions using a non-uniform integer function.

As shown in FIG. 7B, the sub-regions of Region 2 are divided using a power function (e.g., power of 2). The first sub-region of Region 2 is between points $2^n$ and $2^{n+1}$, the second sub-region region of Region 2 is between points $2^{n+1}$ and $2^{n+2}$, th$_e$ third sub region of Region 2 is between points $2^{n+2}$ and $2^{n+3}$ and so on. As shown in FIG. 7B, each sub-region in Region 2 has the same number of input pixel conversion values. In this example, each sub-region has $2^m$ points where m is four. However, m can any natural number greater than zero. In one embodiment, the LUT 607 stores a total of 385 input pixel conversion values and their corresponding output pixel conversion values across Region 1 and Region 2. In one embodiment, the amount of input pixel conversion values and their corresponding output pixel conversion values in Region 1 is different from the amount of input pixel conversion values and their corresponding output pixel conversion values in Region 2.

For each pixel in the converted image data 603 having an input image pixel value in Region 2 of the color conversion function, the second color space converter 605 accesses the LUT 607 to identify the whether the LUT 607 includes an output pixel conversion value that corresponds to the input image pixel value. Responsive to the LUT 607 storing an output pixel conversion value that corresponds to the input image pixel value in Region 2, the second color space converter 605 performs the necessary conversion by fetching the output pixel conversion value that corresponds to the input image pixel value from the LUT 607.

Figure 7C:
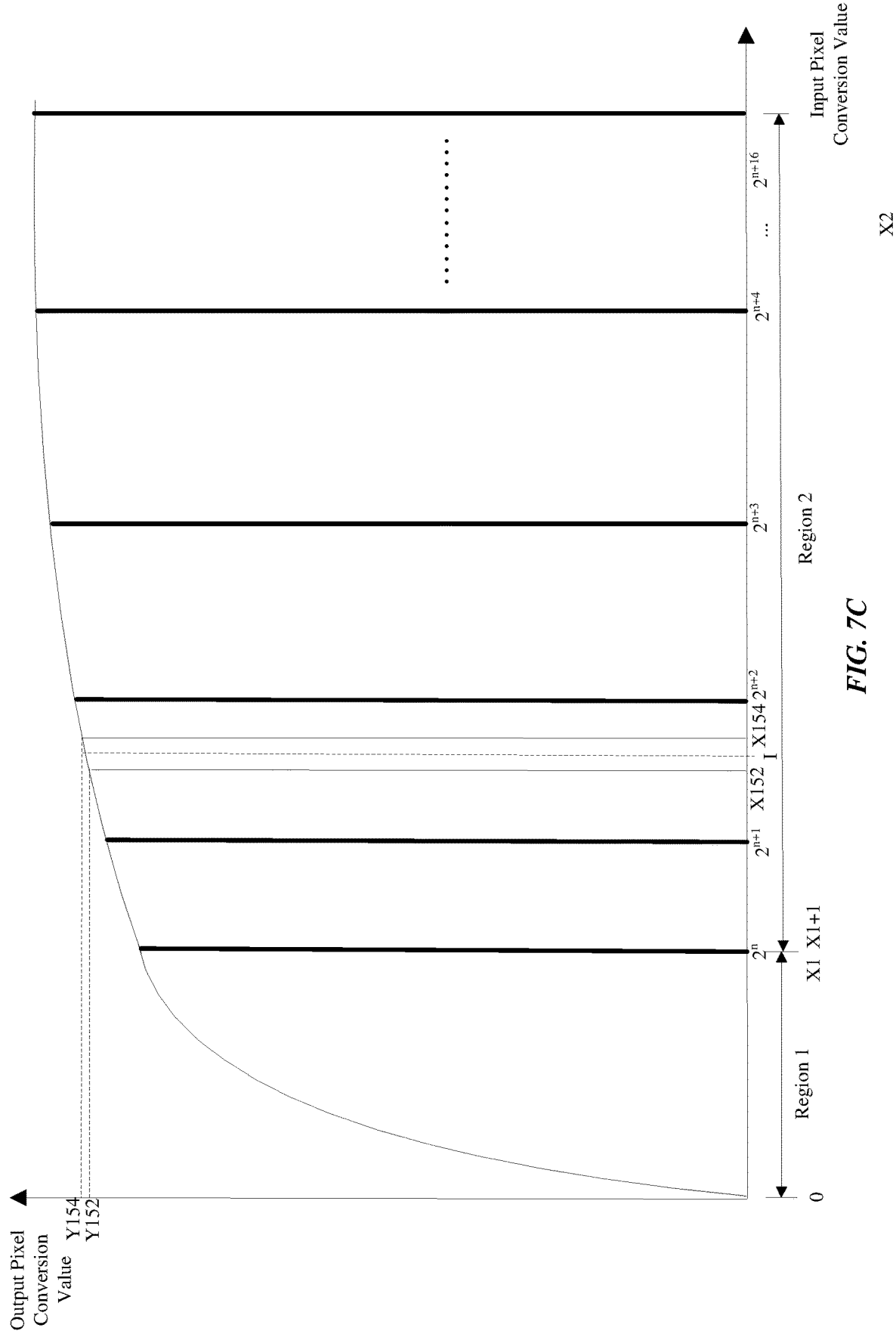

However, if the LUT 607 does not store an output pixel conversion value for the input image pixel value from Region 2 of the color conversion function, additional interpolation is required. Thus, the second color space converter 605 performs interpolation to determine the output pixel conversion value, as described below in detail with respect to FIG. 7C. In the example shown in FIG. 7C, the second color space converter 605 received an image 603 with an input image pixel value I that is within Region 2 of the color conversion function. Given that an output pixel conversion value for input image pixel value I is not stored within LUT 607, the second color space converter 605 performs linear interpolation to determine the corresponding output pixel conversion value for input image pixel value I.

To perform linear interpolation, the second color space converter 605 first identifies the sub-region of Region 2 that includes the input image pixel value I. The second color space converter 605 then identifies two input pixel conversion values stored in the LUT 607 that bound the input image pixel value I within the sub-region of Region 2. One of the two input pixel conversion values has a higher value than the other of the two input pixel conversion values. In this example, the second color space converter 605 determines that the input image pixel value I is in the sub-region between points $2^{n+1}$ and $2^{n+2}$ in Region 2. The second color space converter 605 then determines that the input image pixel value I is between input pixel conversion values X152 and X154 in the identified sub-region and retrieves their corresponding output pixel conversion values Y152 and Y154. Then, the second color space converter 605 performs linear interpolation using the two input pixel conversion values X152 and X154 and their corresponding output pixel conversion values Y152 and Y154 to determine the output pixel conversion value for input image pixel value I (e.g., the color converted version of input image pixel value I). Since all intervals in Region 2 are a power of two, the second color space converter 605 can use a simple shift operation for the linear interpolation for any in-between points thereby avoiding using general division which is computationally more expensive.

Referring back to FIG. 6, when the second color space converter 605 converts the input image pixel values for the converted image data 603 into converted image data 609, the second color space converter 605 outputs the converted image data 609 to a third color space converter 611. The third color space converter 611 converts the converted image data 609 into another color space format. In one embodiment, the third color space converter 611 converts the converted image data 609 into the $IC_TC_P$ color space which complies with the BT.2100 standard for HDR display. After conversion, the third color space converter 611 outputs the converted image data 613 in the $IC_TC_P$ color space.

Referring back to FIG. 5, the multiplexor 509 receives the converted image data 613 in the ICTCP color space from the HDR circuit 503 and receives the tiled version of the clipped fused image data from the pixel assembly 505. The multiplexor 509 outputs to system memory 230 for storage either the converted image data 613 in the $IC_TC_P$ color space or the tiled version of the clipped fused image data based on a selection signal SEL2.

Figure 8:
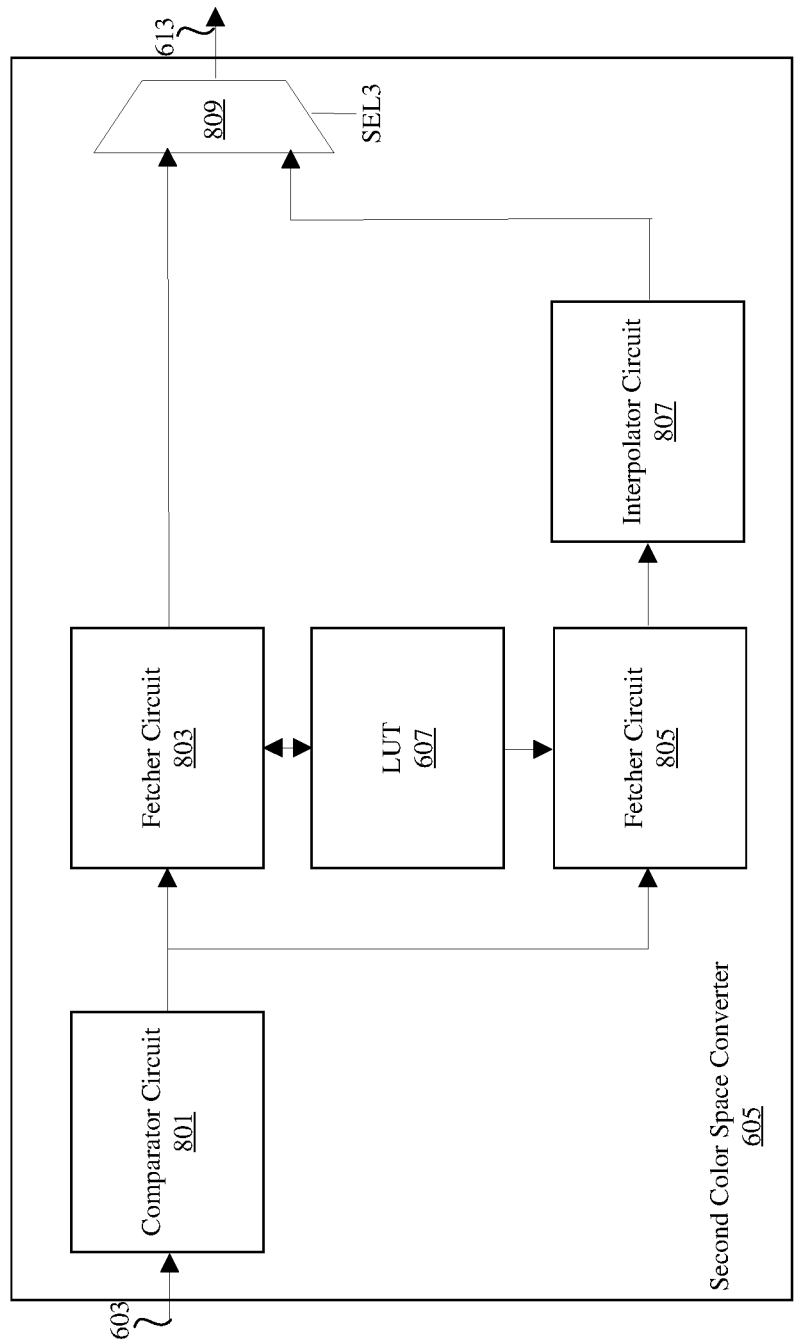
FIG. 8 is detailed block diagram of a color space converter included in the HDR circuit, according to one embodiment.

FIG. 8 is detailed block diagram of the second color space converter 605, according to one embodiment. The second color space converter 605 includes a comparator circuit 801. The comparator circuit 801 receives the converted image data 603 and determines for each input image pixel value in the converted image data 603 whether the input image pixel value is in Region 1 or Region 2 of the color conversion function. In one embodiment, the comparator circuit 801 determines whether each input image pixel value is above or below a pixel value threshold where the pixel value threshold corresponds to the last pixel value in Region 1 of the color conversion function. If the input image pixel value is less than or equal to the pixel value threshold, the input image pixel value is within Region 1 of the color conversion function and the comparator circuit 801 provides the input image pixel value to fetcher circuit 803.

Fetcher circuit 803 bypasses the interpolator 807 and fetches from the LUT 607 the output pixel conversion value corresponding to the input image pixel value that is in Region 1 of the color conversion function. The fetcher circuit 803 provides the output pixel conversion value fetched from the LUT 607 to multiplexor 809 which outputs the converted image data 613 using the fetched output pixel conversion value according to a selection signal SEL3 that is set based on whether the comparator circuit 801 determines that the input image pixel value is in Region 1 or Region 2 of the color conversion function.

If the input image pixel value is greater than the pixel value threshold, the input image pixel value is within Region 2 of the color conversion function and the comparator circuit 801 provides the input image pixel value to fetcher circuit 805. The fetcher circuit 805 determines whether the input image pixel value is indexed (e.g., mapped) to a corresponding output pixel conversion value within Region 2 of the color conversion function. If the input image pixel value is indexed to a corresponding output pixel conversion value in the LUT 607, the fetcher circuit 805 fetches the output pixel conversion value and provides the fetched output pixel conversion value to the multiplexor 809 through interpolator circuit 807 without the interpolator 807 performing interpolation.

However, if the input image pixel value within Region 2 of the color conversion function does not index to a corresponding output pixel conversion value in the LUT 607, the fetcher circuit 805 fetches from the LUT 607 a pair of input pixel conversion values that bound the input image value and their corresponding output pixel conversion values. In one embodiment, the fetcher circuit 805 first determines the sub-region of Region 2 of the color conversion function that includes the input image pixel value. Given that Region 2 is divided into sub-regions based on a power of 2 function, the fetcher circuit 805 can identify the sub-region that includes the input image pixel value based on the leading edge of digital representation of the input image pixel value.

Consider the example where the input image pixel value is 14. The digital representation of 14 is "00001110" assuming an 8-bit format. The leading edge (e.g., most significant bit with a value of 1) is in the $3^{rd}$ position indicating that the input image pixel value of 14 is in the third sub-region of Region 2. In one embodiment, the values in the digital representation of the input image pixel value after the leading edge indicate the points within the identified sub-region that are used to interpolate the output image pixel conversion value for the input image pixel value. For example, the remaining values of "110" indicate the first and second points within the third-sub region are used for interpolation.

The fetcher circuit 805 outputs the fetched output pixel conversion values and input pixel conversion values from LUT 607 to interpolator 807. The interpolator circuit 807 performs linear interpolation using the fetched output pixel conversion values and the fetched input pixel conversion values to calculate the output image pixel value for the input image pixel value. The interpolator circuit 807 provides the calculated output image pixel value to multiplexor 809 which outputs the converted image data 613 using the fetched output image pixel value according to the selection signal SEL3.

Example Process for Performing Color Conversion

Figure 9:
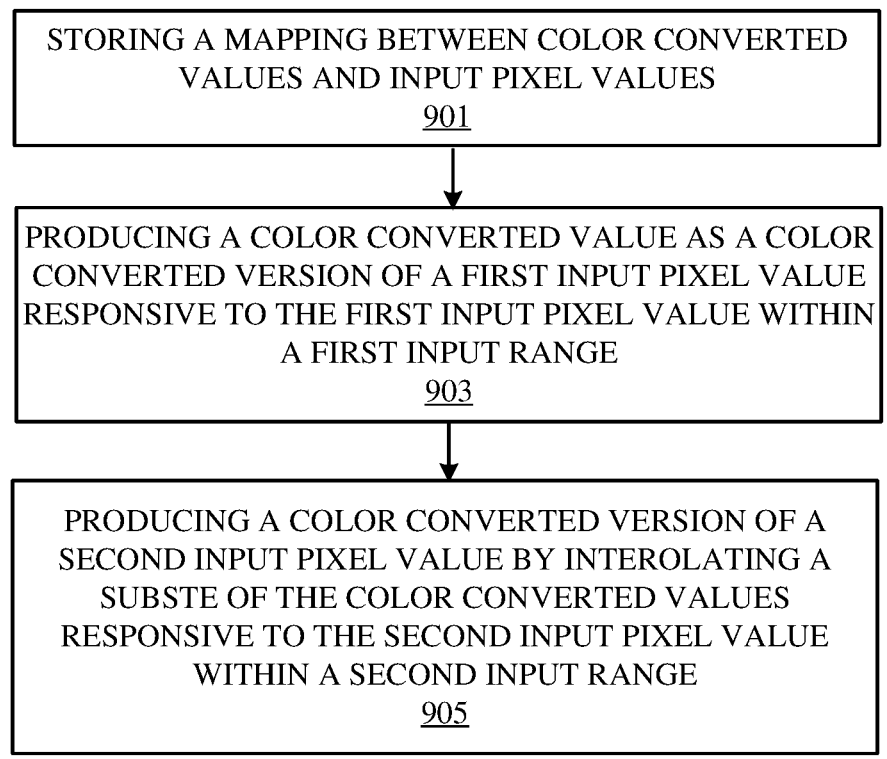
FIG. 9 is a flowchart illustrating a method of converting pixel values using the color conversion function, according to one embodiment.

FIG. 9 is a flowchart illustrating a method of pixel conversion, according to one embodiment. The method may include additional or fewer steps, and steps may be performed in different orders. The method may be performed by HDR circuit 503 of FIG. 5. The HDR circuit 503 stores 901 a mapping between color converted values and input pixel values. In one embodiment, the mapping represents a color conversion function such as the $EOTF^{-1}$ function. The HDR circuit 503 produces 903 a color converted value as a color converted version of a first input pixel value of an image responsive to the first input pixel value within a first input range of the color conversion function. The HDR circuit 503 produces 905 a color converted version of a second input pixel value of the image by interpolating a subset of the color converted values received from the lookup table memory circuit responsive to the second input pixel value within a second input range of the color conversion function. In one embodiment, the second input range distinct from the first input range.

While particular embodiments and applications have been illustrated and described, it is to be understood that the invention is not limited to the precise construction and components disclosed herein and that various modifications, changes and variations which will be apparent to those skilled in the art may be made in the arrangement, operation and details of the method and apparatus disclosed herein without departing from the spirit and scope of the present disclosure.

What is claimed is:

1. A color conversion circuit, comprising:
   a lookup table memory circuit configured to store a mapping between color converted values and input pixel values, the mapping representing a color conversion function;
   a first fetcher circuit coupled to the lookup table memory circuit and configured to produce one of the color converted values received from the lookup table memory circuit as a color converted version of a first input pixel value responsive to the first input pixel value within a first input range of the color conversion function; and
   an interpolator circuit coupled to the lookup table memory circuit and configured to:
      produce a color converted version of a second input pixel value by interpolating a subset of the color converted values received from the lookup table memory circuit responsive to the second input pixel value within a second input range of the color conversion function, the second input range distinct from the first input range, and
      bypass the color converted version of the first input pixel.

2. The color conversion circuit of claim 1, further comprising a comparator circuit configured to:
   determine whether a pixel in an input image has an input pixel value in the first input range or the second input range;
   provide the input pixel value as the first input pixel value to the first fetcher circuit responsive to determining that the input pixel value is in the first input range; and
   provide the input pixel value as the second input pixel value to the interpolator circuit responsive to determining that the input pixel value is in the second input range.

3. The color conversion circuit of claim 1, wherein the second input range of the color conversion function includes a plurality of sub-input ranges, at least two of the plurality of sub-input ranges having a same number of input pixel values and corresponding output pixel values.

4. The color conversion circuit of claim 3, further comprising:
   a second fetcher circuit configured to identify a sub-input range from the plurality of sub-input ranges that includes the second input pixel value and fetch two of the color converted values mapped to two of the input pixel values in the sub-input range as the subset of the color converted values, the second input pixel value higher than one of the two input pixel values and smaller than the other of the two input pixel values.

5. The color conversion circuit of claim 4, wherein the interpolator circuit is configured to produce the color converted version of the second input pixel value by linearly interpolating the two input pixel values.

6. The color conversion circuit of claim 4, wherein the second fetcher is further configured to determine prior to fetching the two of the color converted values whether the second input pixel value maps to a color converted value in the lookup table memory circuit;
   wherein the second fetcher fetches the two of the color converted values responsive to determining that the second input pixel value does not map to a color converted value in the lookup table memory circuit.

7. The color conversion circuit of claim 4, wherein the second fetcher circuit identifies the sub-input range based on a leading non-zero bit in a binary version of the second input pixel value, and uses non-zero bits in the binary version of the second input pixel value that are subsequent to the leading non-zero bit in the binary version to fetch the two of the color converted values that are mapped to the two of the input pixel values in the sub-input range.

8. The color conversion circuit of claim 1, wherein the color conversion function is an inverse electro-optical transfer function (EOTF$^{-1}$).

9. The color correction conversion circuit of claim 1, wherein the first input range and the second input range of the color conversion function are non-overlapping.

10. The color conversion circuit of claim 1, wherein a slope of the of the color correction function in the first input range is steeper than a slope of the of the color correction function in the second input range.

11. The color conversion circuit of claim 1, wherein the lookup table memory circuit is configured to store mapping of all input pixel values in the first input range and store mapping for a subset of input pixel values in the second input range.

12. The color conversion circuit of claim 11, wherein the lookup table memory circuit is configured to store mapping of the subset of input pixel values in the second input range, wherein adjacent ones of the subset of input pixel values have intervals of power of two.

13. The color conversion circuit of claim 10, wherein the lookup table memory circuit is configured to stores a different number of the color converted values for the first input range and the second input range.

14. A method for pixel conversion of a color correction circuit, comprising:
storing a mapping between color converted values and input pixel values in a lookup table memory circuit, the mapping representing a color conversion function;
producing one of the color converted values received from the lookup table memory circuit as a color converted version of a first input pixel value responsive to the first input pixel value within a first input range of the color conversion function; and
producing a color converted version of a second input pixel value by interpolating a subset of the color converted values received from the lookup table memory circuit responsive to the second input pixel within a second input range of the color conversion function, the second input range distinct from the first input range.

15. The method of claim 14, further comprising:
determining whether a pixel in an input image has an input pixel value in the first input range or the second input range;
providing the input pixel value as the first input pixel value responsive to determining that the input pixel value is in the first input range; and
providing the input pixel value as the second input pixel value responsive to determining that the input pixel value is in the second input range.

16. The method of claim 15, wherein the second input range of the color conversion function includes a plurality of sub-input ranges, at least two of the plurality of sub-input ranges having a same number of input pixel values and corresponding output pixel values, the method further comprising:
identifying a sub-input range from the plurality of sub-input ranges that includes the second input pixel value;
fetching two of the color converted values mapped to two of the input pixel values in the sub-input range as the subset of the color converted values, the second input value higher than one of the two input pixel values and smaller than the other of the two input pixel values.

17. The method of claim 16, wherein producing the color converted version of the second input pixel value comprises:
linearly interpolating the two input pixel values.

18. The method of claim 15, further comprising:
determining prior to fetching the two of the color converted values whether the second input pixel value maps to a color converted value in the lookup table memory circuit;
wherein the two of the color converted values are fetched responsive to determining that the second input pixel value does not map to a color converted value in the lookup table memory circuit.

19. The method of claim 16, wherein identifying the sub-input range comprises identifying a sub-input range from the plurality of sub-input ranges that corresponds to a leading non-zero bit in a binary version of the second input pixel value, and
wherein fetching the two of the color converted values comprises identifying the two of the input pixel values in the sub-input range that correspond to non-zero bits in the binary version of the second input pixel value that are subsequent to the leading non-zero bit.

20. A system for pixel conversion, comprising:
an image sensor configured to obtain an image; and
an image signal processor coupled to the image sensor, the image signal processor
configured to perform processing of the image, the image signal processor including:
a lookup table memory circuit configured to store a mapping between color converted values and input pixel values, the mapping representing a color conversion function;
a first fetcher circuit coupled to the lookup table memory circuit and configured to produce one of the color converted values received from the lookup table memory circuit as a color converted version of a first input pixel value responsive to the first input pixel value within a first input range of the color conversion function; and
an interpolator circuit coupled to the lookup table memory circuit and configured to:
produce a color converted version of a second input pixel value by interpolating a subset of the color converted values received from the lookup table memory circuit responsive to the second input pixel within a second input range of the color conversion function, the second input range distinct from the first input range, and
bypass the color converted version of the first input pixel.

* * * * *